April 1, 1924.
A. W. KEUFFEL
1,488,686
LOG LOG DUPLEX SLIDE RULE
Filed June 6, 1922
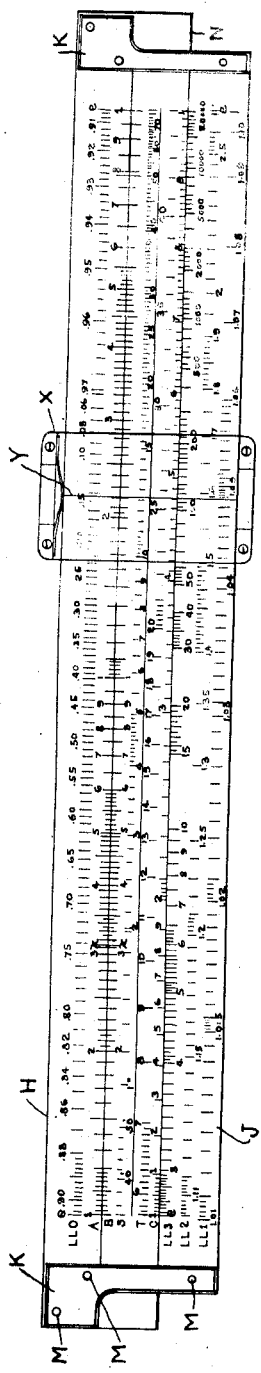
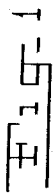
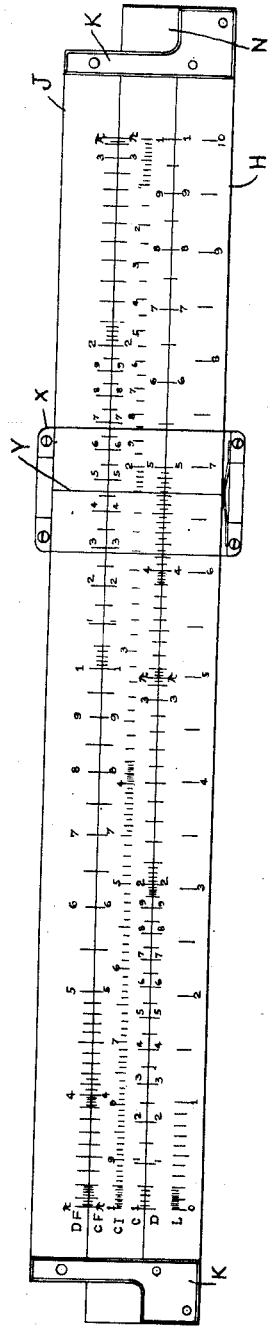

Patented Apr. 1, 1924.

1,488,686

UNITED STATES PATENT OFFICE.

ADOLF W. KEUFFEL, OF MONTCLAIR TOWNSHIP, ESSEX COUNTY, NEW JERSEY, ASSIGNOR TO KEUFFEL & ESSER COMPANY, OF HOBOKEN, NEW JERSEY, A CORPORATION OF NEW JERSEY.

LOG-LOG DUPLEX SLIDE RULE.

Application filed June 6, 1922. Serial No. 566,340.  REISSUED

*To all whom it may concern:*

Be it known that I, ADOLF W. KEUFFEL, a citizen of the United States, residing at 763 Bloomfield Avenue, in the township of Montclair, in the county of Essex and State of New Jersey, have invented certain new and useful Improvements in Log-Log Duplex Slide Rules, of which the following is a specification.

My invention relates to slide rules, and more particularly to a log log duplex slide rule, and the novelty consists of the construction adaptation and arrangement of the parts as will be more fully hereinafter pointed out.

The use of slide rules in many lines of business as well as professions has increased rapidly with the demand for quick and accurate solution of mathematical problems because the processes of business have changed, whereby instead of leaving the solution of such problems to the convenience of a corps of poorly paid clerks such problems are now solved immediately by the use of suitable slide rules adapted for the particular purpose required. This has resulted in the development and marketing of a large number of different types of slide rules adapted for many different purposes, but never has there been a slide rule especially adapted for figuring fractional powers and roots whereby such problems may be solved directly on the rule.

My slide rule solves this problem and furnishes a means of solving problems involving decimal quantities directly by the use of a decimal logarithmic scale and without the use of reciprocals.

Referring to the drawings Figure 1 is a top plan view of my slide rule; and Figure 2 is a top plan view of the reverse side of my slide rule.

In the drawings bars H and J are rigidly secured together by means of plates K which are riveted thereto at M, so that a sliding bar N may be mounted between said bars H and J so as to be readily slidable longitudinally thereof. The slidable bar N has the usual tongue members on each edge adapted to slide in the usual groove members on the edges of the bars H and J contiguous to the sliding bar B so that the sliding bar N is always held in engagement between the bars H and J in whatever position it occupies longitudinally thereof. A runner or indicator X, transparent on both faces and of usual construction, is mounted over said bars H, J and N so as to be readily moved into any position desired between the plates K, and the runner X has a hairline Y on each side thereof.

On the front of my slide rule as shown in Figure 1, the upper scale on the bar H is designated as LL0 and gives the graduated log-log fractional or decimal readings from .05 to .97. The next scale on the bar H is designated as A and contains the standard graduated logarithmic scale of two unit lengths from 1 to 10. The upper scale on the sliding bar N is designated as B, and has the same graduation as the scale A on the bar H. A second scale on the sliding bar N is designated as S, and has a graduated sine scale of degrees and minutes from 34' to 90° and is used with reference to scales A and B. The third scale on the sliding bar N is designated as T and has a graduated standard tangent scale with divisions from 5° 43' to 45°. The fourth scale on the sliding bar N is designated as C and has standard graduated logarithmic divisions of full unit length from 1 to 10. The upper scale on the bar J is designated as LL3, and has log log graduations from 2.7 to 20,000. The second scale on the bar J is designated as LL2, and has log log graduations from 1.105 to 2.7. The third scale on the bar J is designated as LL1, and has log log graduations from 1.01 to 1.105.

On the back of my slide rule, as shown in Figure 2, the scale shown on bar J is designated as D F, and is a standard logarithmic scale of full unit length the same as the C scale described above, except that it is folded and has its index at the centre. The upper scale on the sliding bar N is designated as C F, and is identical with the scale D F on bar J. The second scale on the sliding N is designated as CI and is a standard reciprocal logarithmic scale of full unit length graduated from 10 to 1. The third scale on the sliding bar N is designated as C and is a standard logarthmic scale of full unit length identical with C scale above described. The first scale on the bar H is designated as D, and is the same as the scale C on the sliding bar N. The second scale on the bar H is designated as L and is a scale of equal parts from 0 to 10, and is used to obtain common logarithms when referred to scale D.

As has been above stated there have been log log slide rules on the market for some time, and with these log log slide rules it is possible to solve problems involving fractional powers and roots as well as natural or hyperbolic logarithms. These log log slide rules of the prior art had graduated logarithmic scales designed as LL1, LL2 and LL3, the same as illustrated herein.

On these slides rules embodying the logarithmic scales mentioned it was not possible to handle decimal or fractional roots and powers directly, as the reciprocal of the quantity must be first taken thereon, and this reciprocal then evaluated in the integral scales and then the reciprocal of the result taken in order to get the required answer. This operation involved a number of additional operations, both mentally and mechanically, and increased the liability of error, as the correctness of the result depended not on the mechanical operation of the slide rule alone, but also upon the mental operation of the operator combined with the mechanical operation of the slide rule.

My slide rule has overcome this difficulty and made it possible to handle decimal or fractional roots and powers so as to obtain the solution of examples in formulas involving fractional powers and roots directly on my slide rule by mere mechanical operation of the same and without the use of reciprocals of the quantities handled, thereby eliminating any separate mental operation and the possibility of errors involved therein.

In the equation of the catenary curve and in hyperbolic functions, the expression $e^{-x}$ occurs, in which $e^{=2.7182+}$ is the base of natural or Napierian logarithms, also in many formulas the logarithms to base "$e$" is required or is to be taken as a factor.

By placing the reciprocal of "$e$" on scale LL0 in alignment with an index "1" of the regular logarithmic scale A, the values of $e^{-x}$ can be at once read for all values of "$x$" within the range of the scale, without the setting of the slide N and also the co-logarithms to base "$e$" can be directly read on A.

In order to make this clearer I will give a few examples, showing the old method as heretofore used and showing how to solve the problems by the new method.

*Example 1.*

Required $x=0.8^5$.

By the old method it is necessary to set the runner or indicator to .8 on scale C; read the reciprocal which is 1.25 on scale CI on the reverse side of the rule, keep this number 1.25 in mind and then set the right index of scale C to this number 1.25 on scale LL2 and opposite 5 on scale C read 3.05 on scale LL3, now keep 3.05 in mind and then set runner to this number 3.05 on C; and read the reciprocal .328 on CI which is the answer sought.

It will be noted that in this problem besides various operations of the slide and runner, it was necessary to take two readings mentally and reset the same on the slide rule, which may readily cause an error.

By my new method all that is necessary to solve the above example is to set the left index of scale B to 0.8 on scale LL0 and opposite 5 on scale B read answer .328 on scale LL0.

*Example 2.*

Required $\log_e .635$.

Old method—set runner to .635 on C; read reciprocal 1.575 on CI, keep this number in mind and set runner to 1.575 on LL2: read .454 on D=$\log_e$ 1.575. Taking the co-logarithm gives $\overline{1}.546$ as the answer. By the new method set the runner to .635 on scale LL0, read .454 on scale A, this is the co-logarithm which deducted from "0" gives $\overline{1}.546$ as the answer.

I claim:

1. In a slide rule having two fixed bars and one sliding bar, a standard logarithmic scale on said sliding bar and a log log scale of decimal quantities on one of said fixed bars so arranged with respect to each other that the hyperbolic co-logarithms of numbers can be read directly from one to the other.

2. In a slide rule a standard logarithmic scale, and a log log scale of decimal quantities, so arranged with respect to each other that the numbers on the log log scale are in alignment with their respective hyperbolic co-logarithms on the standard scale, whereby the hyperbolic co-logarithms of numbers can be read directly from one to the other.

3. In a slide rule, a log log scale of decimal quantities, a standard logarithmic double scale, one of the latter scales moveable relative to the other, and to the log log scale, the said log log scale so arranged with respect to the said logarithmic scales, that numbers on the log log scale are in alignment with their respective hyperbolic co-logarithms, on the logarithmic scales, whereby the hyperbolic co-logarithms of numbers can be read directly from one to the other.

In testimony whereof I affix my signature in presence of two witnesses.

ADOLF W. KEUFFEL.

Witnesses:
A. F. MENZER,
B. B. VAN SICKLE.